United States Patent
Birdi et al.

(10) Patent No.: US 9,664,232 B2
(45) Date of Patent: May 30, 2017

(54) GENERATOR ASSEMBLY FOR HIGH AXIAL VIBRATION INPUT

(71) Applicant: HONEYWELL INTERNATIONAL, INC., Morristown, NJ (US)

(72) Inventors: Balwinder Singh Birdi, Tucson, AZ (US); Simon Waddell, Oro Valley, AZ (US); William Scherzinger, Oro Valley, AZ (US); David Windish, Oro Valley, AZ (US); Robert Cisneroz, Tucson, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 688 days.

(21) Appl. No.: 13/945,174

(22) Filed: Jul. 18, 2013

(65) Prior Publication Data

US 2015/0022034 A1 Jan. 22, 2015

(51) Int. Cl.
*H02K 5/24* (2006.01)
*H02K 5/16* (2006.01)
(Continued)

(52) U.S. Cl.
CPC .............. *F16C 33/58* (2013.01); *F16C 19/04* (2013.01); *H02K 5/161* (2013.01); *H02K 5/173* (2013.01); *H02K 5/24* (2013.01)

(58) Field of Classification Search
CPC ......... H02K 5/24; F16C 27/04; F16C 27/066; F16C 19/04
(Continued)

(56) References Cited

U.S. PATENT DOCUMENTS 5,462,410 A 10/1995 Smith et al.
5,564,903 A * 10/1996 Eccles .................. F01D 25/164
244/58
(Continued)

FOREIGN PATENT DOCUMENTS

DE 102010020912 A1 11/2011
EP 0002569 A1 6/1979
(Continued)

OTHER PUBLICATIONS

Akturk et al., Damping the Vibrations of a Rigid Shaft Supported by Ball Bearings by Means of External Elastomeric O-ring Dampers, Webpage—Sage Journals, May 1994.
(Continued)

*Primary Examiner* — Quyen Leung
*Assistant Examiner* — Eric Johnson
(74) *Attorney, Agent, or Firm* — Shimokji IP

(57) ABSTRACT

A generator assembly may include a bearing liner and a bearing retainer configured to reduce vibration response in a bearing assembly under high frequency operation of a rotor. The bearing liner may be configured to provide a clearance between the bearing assembly and an adjacent housing/bearing liner to prevent high vibration output from the bearing assembly on for example, the rotor shaft. The bearing retainer may include a recess to accommodate axial movement of the bearing assembly in response to rotation of the rotor. In some embodiments, the bearing retainer may include a dampener to dampen contact of the bearing assembly with the retainer.

3 Claims, 3 Drawing Sheets

(51) Int. Cl.
 *F16C 33/58* (2006.01)
 *F16C 19/04* (2006.01)
 *H02K 5/173* (2006.01)

(58) Field of Classification Search
 USPC .................................... 310/51, 90; 384/536
 See application file for complete search history.

(56) References Cited

U.S. PATENT DOCUMENTS

| | | | | |
|---|---|---|---|---|
| 5,685,694 | A * | 11/1997 | Jones | F01D 7/02 416/147 |
| 5,748,748 | A * | 5/1998 | Fischer | G10K 11/1786 381/71.4 |
| 2003/0099417 | A1* | 5/2003 | Bauer | F16C 27/04 384/535 |
| 2007/0116396 | A1* | 5/2007 | Young | F16C 27/066 384/537 |
| 2011/0285233 | A1 | 11/2011 | Singhal et al. | |

FOREIGN PATENT DOCUMENTS

| | | | |
|---|---|---|---|
| EP | 0712996 | A1 | 5/1996 |
| GB | 2279819 | A | 1/1995 |
| WO | WO9514865 | A1 | 6/1995 |

OTHER PUBLICATIONS

Rex Swensen, Miniature Ball Bearings in Clocks by Rex Swensen—Sydney, Webpage—Boca Bearings.
European Search Report in EP Application No. 14175327.7 dated Mar. 24, 2016.

* cited by examiner

US 9,664,232 B2

GENERATOR ASSEMBLY FOR HIGH AXIAL VIBRATION INPUT

BACKGROUND OF THE INVENTION

The present invention generally relates to generator assemblies, and more particularly, a generator assembly for high axial vibration input.

A conventional generator assembly may utilize two ball bearings preloaded with a spring washer. To achieve preload one bearing may usually be clamped to the housing structure while the other bearing may float axially. In conventional machines, with lower generator operating frequencies, this may not be a problem. However, under heavy axial vibration input for example, 20 g which may be a typical input caused by generators in next generation machines, the rotor may move causing very high amplitudes at a given sine input as the rotor displacement may be greater than the internal bearing clearance. As a result, the rotor may become fully clamped as a result and may move with the housing with an extreme resonant response. Rotor momentum may generate very high loads on a bearing liner on one side of the bearing and a bearing retainer on the other. The high loads may cause surrounding parts of the bearing to fail, for example, the clamping bolts.

As can be seen, there is a need for a generator assembly which may reduce vibration output from a bearing under high frequency operating conditions.

SUMMARY OF THE INVENTION

In one aspect of the present invention, a generator assembly comprises a bearing assembly disposed adjacent to a shaft; and a bearing retainer adjacent the bearing assembly, the bearing retainer including a recess configured to receive a portion of an end of the bearing assembly in response to axial movement of the bearing assembly relative to the shaft.

In another aspect of the present invention, a generator assembly comprises a housing; a rotor and stator in the housing; a bearing assembly between a shaft of the rotor and a portion of the housing; and a bearing liner between the portion of the housing and the bearing assembly, the bearing liner configured to provide clearance between the portion of the housing and the bearing assembly based on a predetermined frequency range of operation induced by rotation of the shaft by the rotor or induced by a source external to the generator assembly.

In another aspect of the present invention, a generator assembly comprises a housing; a rotor and stator in the housing; a bearing assembly between a shaft of the rotor and a portion of the housing; a bearing liner adjacent the portion of the housing and spaced from a first axial end of the bearing assembly; and a bearing retainer adjacent a second axial end of the bearing assembly, the bearing retainer including a recess to accommodate a portion of the bearing assembly in response to axial movement of the bearing assembly induced by vibration caused by rotation of the shaft or induced by a source external to the generator assembly.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

The present invention generally provides vibration protection for a bearing assembly in a generator which may be particularly beneficial in high frequency operation environments. For example, helicopters, tanks, etc. may use generators whose operation may induce relatively high vibration output. High amplitudes of vibration may cause deleterious effects on the generator parts causing breakdown. Exemplary embodiments of the present invention may anticipate potentially destructive harmonics in the generator and may provide for a safer operating environment under high frequency generator operations.

Figure 1:
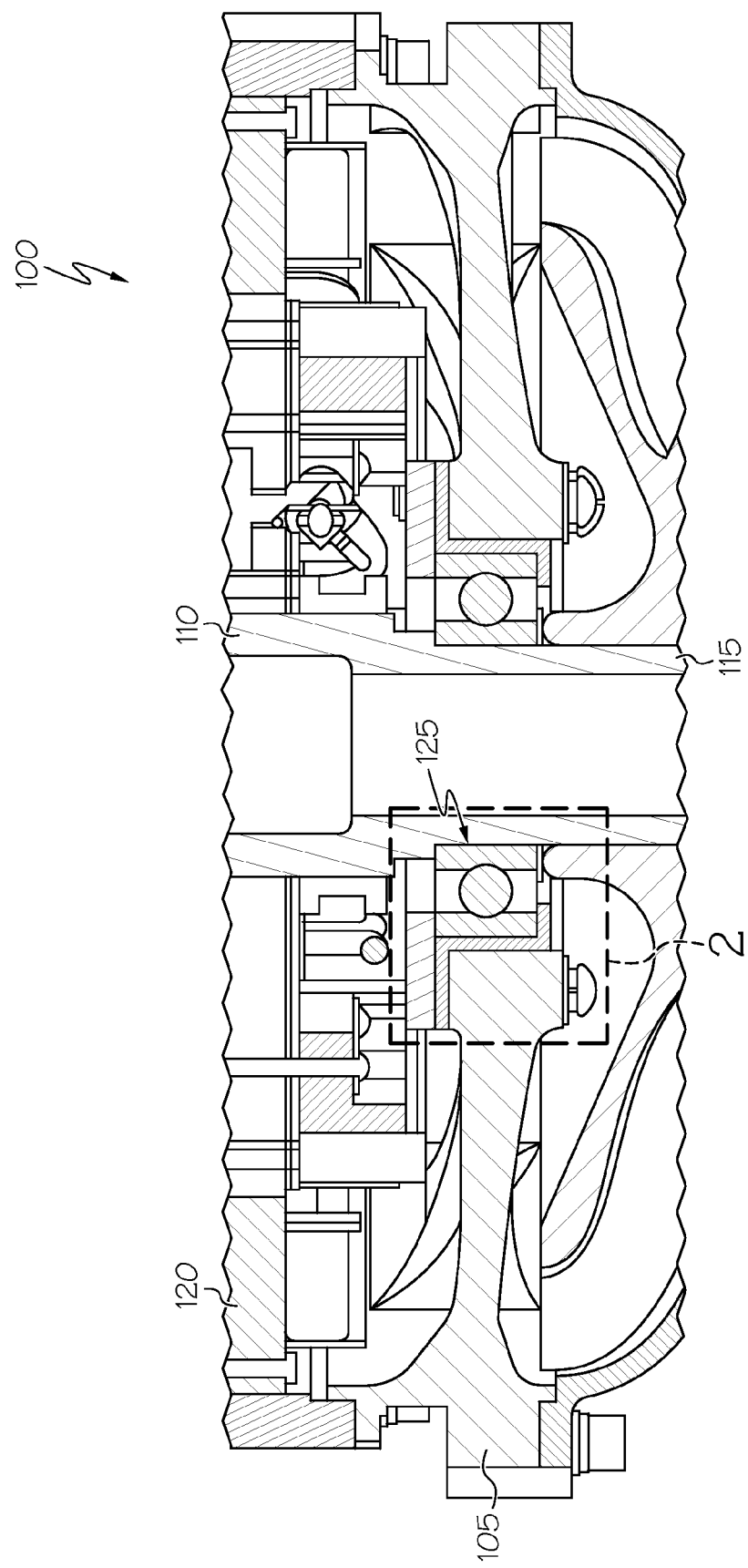
FIG. 1 is a schematic cross-sectional side view of a generator assembly in accordance with an exemplary embodiment of the present invention.

Referring now to FIG. 1, a generator assembly 100 is shown according to an exemplary embodiment of the present invention. The generator assembly 100 generally includes a housing 105, a rotor 110, a stator 120, and a bearing assembly 125. The rotor 110 may include a shaft 115 disposed to move axially through the housing 105 in response to the rotor 110 being driven by excitation of the stator 120 or an external source, for example, a source external to the generator assembly 100 (e.g. vibration frequencies generated by engine rotor (not shown)).

Figure 2:
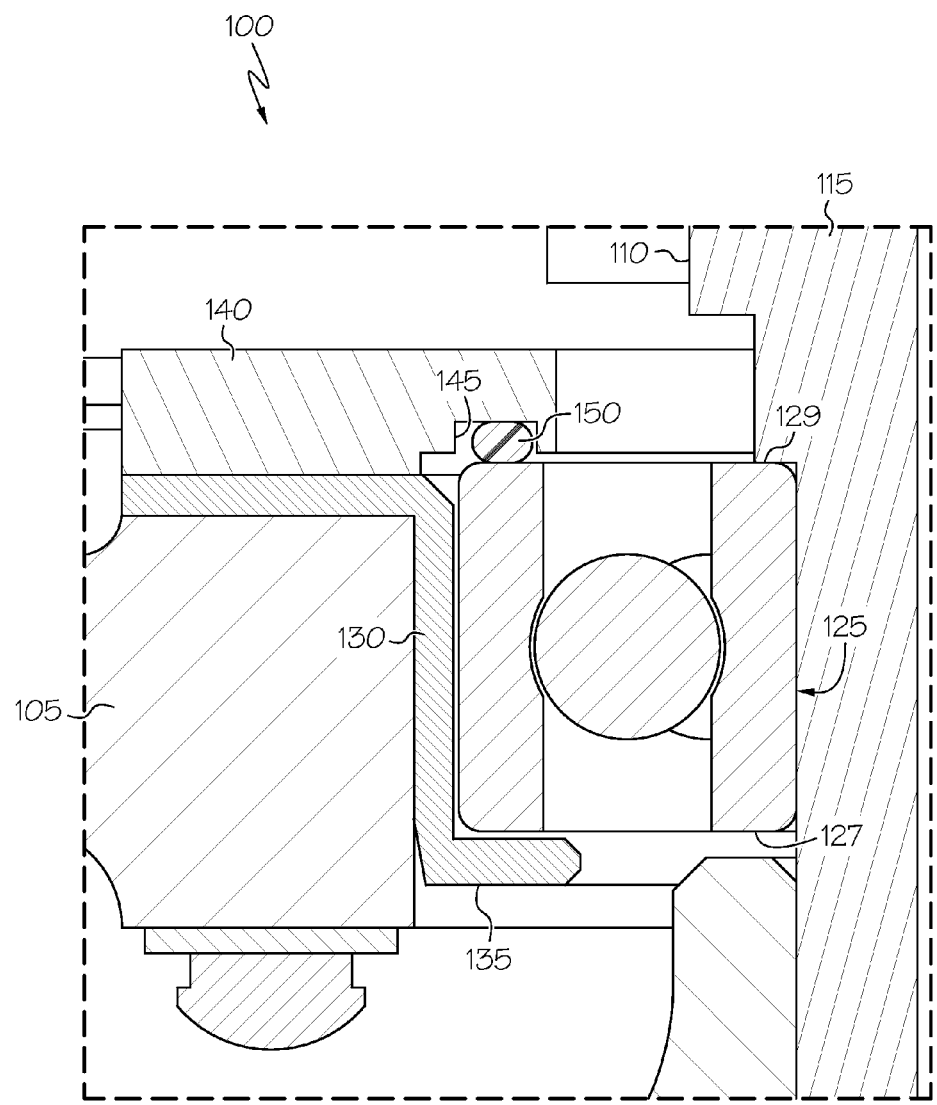
FIG. 2 is an enlarged detail view of the square 2 of FIG. 1 showing the assembly under use during dynamic condition.
Figure 3:
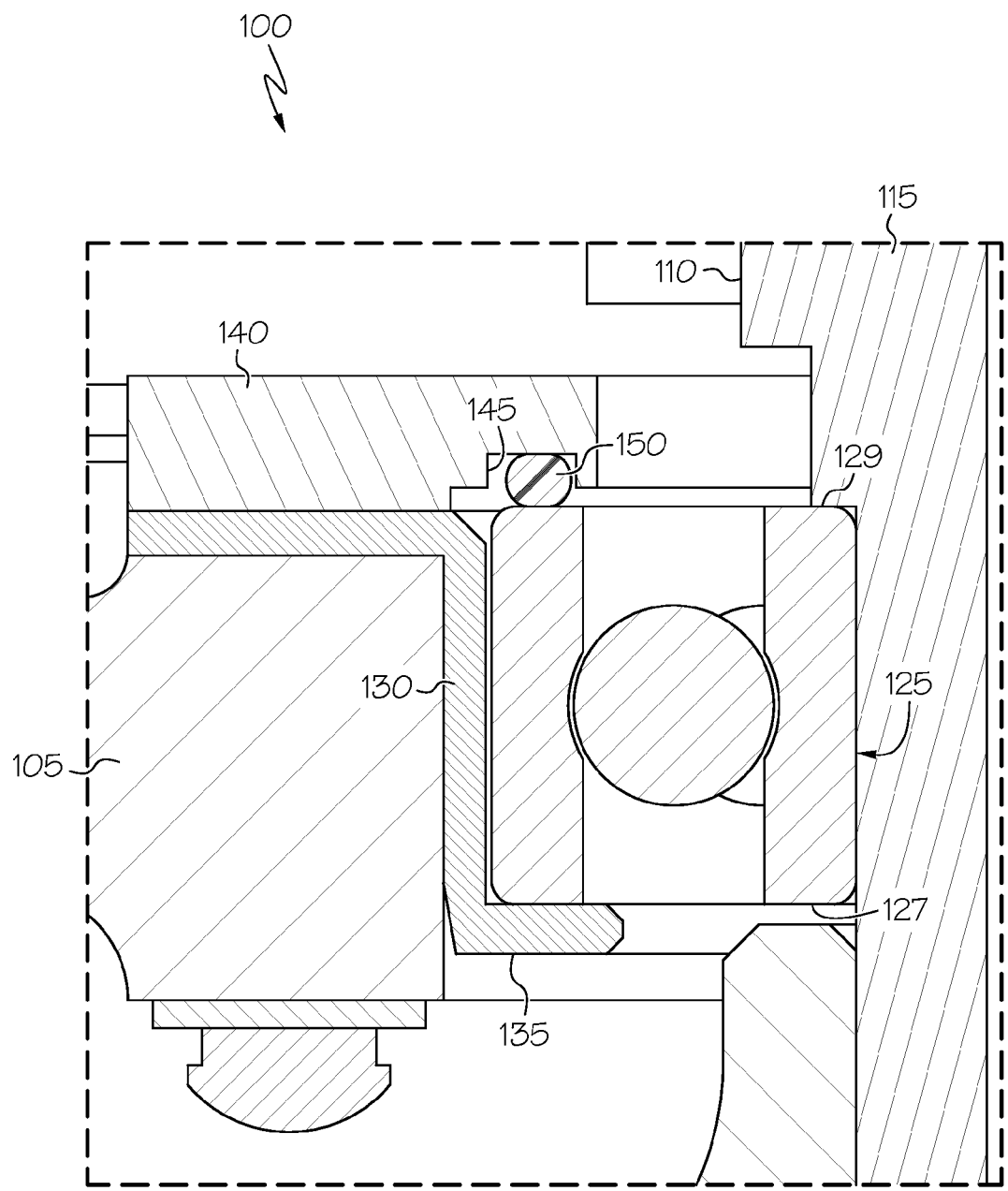
FIG. 3 is an enlarged detail view of the square 2 of FIG. 1 showing the assembly under assembly condition.

Referring now to FIGS. 2 and 3, details of the generator assembly 100 are shown according to an exemplary embodiment of the present invention. FIG. 2 shows a bearing liner 130 spaced from the bearing assembly 125 during a dynamic condition under use. FIG. 3 shows the bearing liner 130 abutting the bearing assembly 125 during an assembly condition as a preload may push the bearing assembly 125 toward a surface of the bearing liner 130. The generator assembly 100 may be configured to accommodate axial movement of the bearing assembly 125 induced by generator operation under rotation of the shaft 115. For example, the rotor 110 may operate in a range of frequencies between 10 Hz and 2000 Hz causing vibration input between 1 g to approximately 20 g (g=the force of gravity). An exemplary operating frequency in a helicopter, for example, may be approximately 193 Hz. Damage caused by vibration in the generator assembly 100 may be avoided by features of the bearing liner 130 and a bearing retainer 140 described in detail below.

The bearing liner 130 may be between the housing 105 and the bearing assembly 125. The bearing liner 130 may be configured to provide clearance between the bearing liner 130 and the bearing assembly 125. The amount of clearance between the bearing assembly 125 and the bearing liner 130 may correspond to an amount of space needed to avoid harmonic vibration in the bearing assembly 125 with the surrounding elements of the generator assembly 100 at the operating frequency of the shaft 115. In an exemplary embodiment, a portion 135 of the bearing liner 130 may be spaced from an axial end 127 of the bearing assembly 125. The axial end 127 may be orthogonal to an axis of rotation of the shaft 115. The portion 135 may project over the axial end 127 and in some embodiments, may also be orthogonal to the shaft 115. The portion 135 may cover some or the entire axial end 127. It may be appreciated that the clearance provided by the bearing liner 130 may change the generator assembly's 100 natural vibration frequency and amplitude. Thus the bearing assembly 125 may move axially (relative to the rotation of the shaft 115) without encouraging amplified vibration with surrounding elements.

A bearing retainer 140 may be adjacent the bearing assembly 125. The bearing retainer 140 may be configured to dampen axial movement of the bearing assembly 125, and may be particularly helpful during axial movement of the rotor 110 at lower operating frequencies. The bearing retainer 140 may include a recess 145. The recess 145 may be configured to receive some or all of an axial end 129 of the bearing assembly 125. In an exemplary embodiment, only a portion of the bearing assembly 125 may occupy the recess 145. In some embodiments, a damper 150 may occupy the recess 145. The damper 150 may dampen axial movement of the bearing assembly 125. The damper 150 may for example, be an O-ring absorbing energy from the bearing assembly 125 and pushing the bearing assembly 125 back toward the bearing liner portion 135.

In operation, the clearance provided by the bearing liner 130 may lower the typical system (generator assembly 100) vibration amplitude so that axial movement of the bearing assembly 125 does not resonate with adjacent elements at high operating frequencies. The bearing retainer 140 may prevent damage at lower operating frequencies by dampening contact with the bearing assembly 125 as axial forces may shift the bearing assembly 125 toward the rotor 110. The following tables show the impact of embodiments of the present invention on generator assemblies with and without features described above. Table 1 shows the impact of vibration on a bearing assembly in a conventional generator assembly in response to operating at a test frequency (192.93 Hz) of a typical high frequency machine (for example, a helicopter). The input amplitude and the response of a part are measured in the force of gravity g.

TABLE 1

| Generator Part | Input Amplitude (g) | |
|---|---|---|
| | 10 Response Amplitude (g) | 15 Response Amplitude (g) |
| Housing | 11.79 | 17.85 |
| Shaft | 4.43 | 87.48 |

As may be appreciated, the response of by the bearing assembly to high vibration input increases significantly as the input amplitude increases. The housing responded with increased vibration amplitude as the input amplitude increased. The shaft under test responded with a very high resonant amplitude which causes it to fall out of safety specifications and is likely to fail and break.

Table 2 shows the impact of vibration under the same test frequency (192.93 Hz) with the features according to exemplary embodiments described above incorporated into a generator assembly.

TABLE 2

| Generator Part | Input Amplitude (g) | | |
|---|---|---|---|
| | 10 Response Amplitude (g) | 15 Response Amplitude (g) | 19.29 Response Amplitude (g) |
| Housing | 9.36 | 13.98 | 18.55 |
| Shaft | 3.00 | 4.30 | 5.16 |

As may be appreciated, the effect of the features described above appears to provide less vibration amplitude in both the housing and shaft in response to the input amplitude. More particularly, the response of the shaft using features of the present invention at a 15 g input is 20 times less than the response of the shaft without the present invention. The shaft response using embodiments of the present invention also appears to remain consistently well below the resulting vibration response of the conventional generator assembly shaft at an even higher input amplitude.

It should be understood, of course, that the foregoing relates to exemplary embodiments of the invention and that modifications may be made without departing from the spirit and scope of the invention as set forth in the following claims.

We claim:

1. A generator assembly, comprising:
    a housing;
    a rotor and stator in the housing;
    a bearing assembly between a shaft of the rotor and a portion of the housing;
    a bearing liner adjacent the portion of the housing and spaced from a first surface of the bearing assembly, wherein a portion of the bearing liner is configured to project over an entirety of the first surface of the bearing assembly, wherein the first surface of the bearing assembly is orthogonal to an axis of rotation of the shaft;
    a bearing retainer adjacent a second surface of the bearing assembly, the bearing retainer including a recess to accommodate all of the second surface of the bearing assembly, wherein the second surface of the bearing assembly is orthogonal to an axis of rotation of the shaft in response to axial movement of the bearing assembly induced by vibration caused by rotation of the shaft or induced by a source external to the generator assembly; and
    a dampener disposed in the recess, wherein the dampener is in direct contact with the bearing assembly.

2. The generator assembly of claim 1, wherein the dampener is an O-ring.

3. The generator assembly of claim 1, wherein the bearing assembly is disposed in the generator assembly to move into the recess in response to an input operating frequency in the range of 10 Hz and 2000 Hz.

* * * * *